United States Patent [19]

Barrett

[11] Patent Number: 4,667,458

[45] Date of Patent: May 26, 1987

[54] RAKE

[76] Inventor: Carl Barrett, 118 N. Royal, Mobile, Ala. 36601

[21] Appl. No.: 831,270

[22] Filed: Feb. 20, 1986

[51] Int. Cl.⁴ .............................................. A01D 7/00
[52] U.S. Cl. ............................... 56/400.16; 56/400.17
[58] Field of Search ........... 56/400.01, 400.12, 400.17, 56/400.16

[56] References Cited

U.S. PATENT DOCUMENTS

| | | | |
|---|---|---|---|
| 1,172,981 | 2/1916 | Gorman | 56/400.16 |
| 1,260,906 | 3/1918 | Jarrett | 56/400.01 |
| 1,591,738 | 7/1926 | Bell | 56/400.16 |
| 1,715,613 | 6/1929 | McFadden | 56/400.12 |
| 2,486,395 | 11/1949 | Erickson | 56/400.12 |
| 2,787,203 | 4/1957 | Smith | 56/400.01 |
| 3,108,426 | 10/1963 | Rugg | 56/400.01 |
| 3,332,223 | 7/1967 | Polisso | 56/400.17 |
| 4,219,993 | 9/1980 | Cosmos | 56/400.17 |
| 4,406,113 | 9/1983 | Mullins | 56/400.16 |

FOREIGN PATENT DOCUMENTS

| | | | |
|---|---|---|---|
| 28477 | 7/1956 | Finland | 56/400.17 |
| 919607 | 2/1963 | United Kingdom | 56/400.12 |

Primary Examiner—Paul J. Hirsch
Attorney, Agent, or Firm—Sixbey, Friedman & Leedom

[57] ABSTRACT

An improved rake is provided with a tine end section having downwardly projecting leaf-engaging tine ends and a unitary support section which connects the tine end section to a rake handle. Pile-handling bars extend from the unitary support section in the same direction as the leaf-engaging tine ends, and are substantially spaced from the tine end section. These bars, with the leaf-engaging tine ends and the unitary support section, provide a chamber in which material can accumulate.

15 Claims, 4 Drawing Figures

U.S. Patent  May 26, 1987  4,667,458
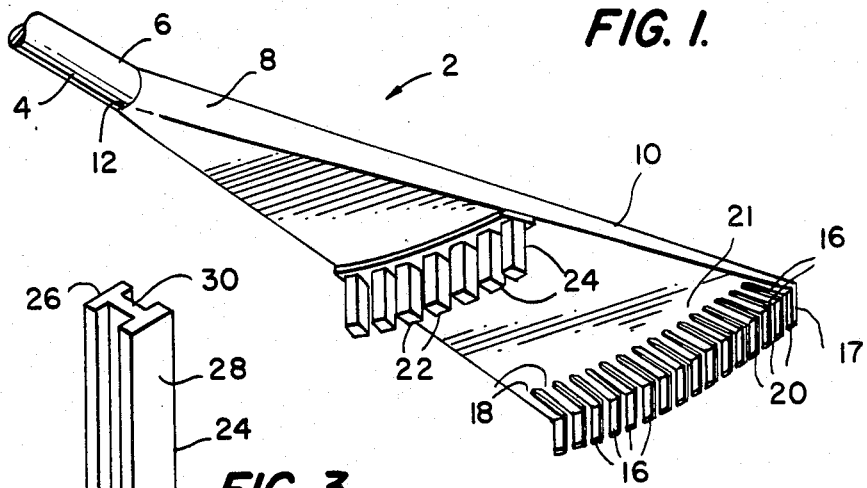
FIG. 1.
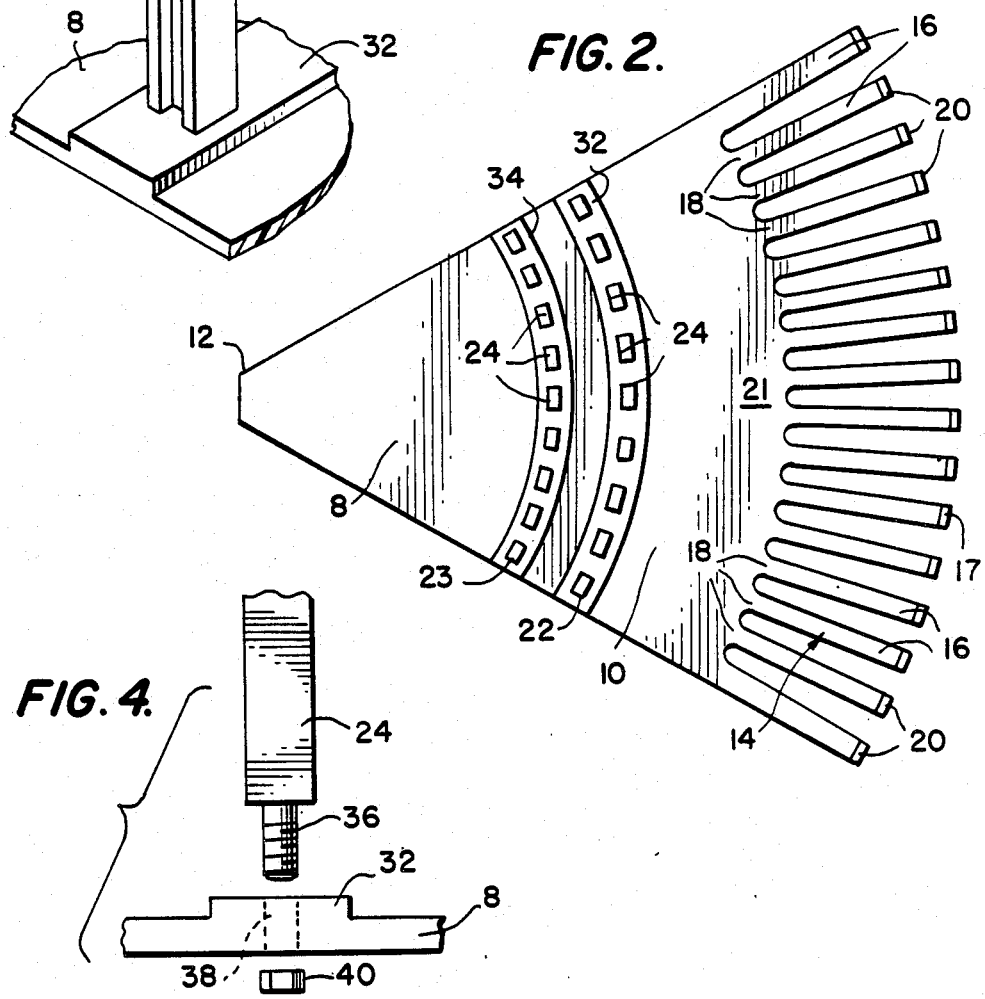
FIG. 3.
FIG. 2.
FIG. 4.

RAKE

TECHNICAL FIELD

This invention relates to rakes, and more particularly, to a tined rake suitable for use in accumulating or gathering leaves, grass and the like in general lawn and garden type use.

BACKGROUND ART

The structure of tined devices commonly known as rakes is both familiar and has long been known. Conventional rakes, while adequate for the accumulation or gathering of material such as leaves or grass clippings, experience tremendous efficiency problems as a result of such accumulation. That is, the user must either cease raking operations and remove the accumulated pile of material by another means or, in the alternative, exert a sufficiently large pressure on the rake to move the entire mass of accumulated material along the surface to be raked. The pressure required to move such a mass of material results in individual tines bending or breaking at the root end of the tines; that is, at the end where the tines are attached to the rake head. Because these ends of the tines, and the adjacent end of the rake head, are highly stressed by the pressure exerted by a user to move a pile, it is not infrequently that tines will break completely from the rake head and that the rake head itself will become weakened and cracked. The rake of the present invention is directed to this problem.

In an example typical of the prior art. U.S. Pat. No. 3,724,188 to H. O. Eads shows a rake having a conventional tined rake head formed of polypropylene to be lighter than other conventional steel or bamboo tined rakes. The rake head is strengthened by ribs, but there is no suggestion of any means which facilitate and increase efficiency of handling or moving a pile of material accumulated during a raking operation without damaging the tines or rake head.

U.S. Pat. No. 1,591,738 to C. H. Bell shows a garden-type rake having an elongated, bar-like rake head of small dimensional cross section with relatively short, rigid teeth extending from this head. To adapt such a rake for gathering lighter articles such as leaves, a flanged channel bar fits over the rake head and a set of flat spring teeth is secured to the channel bar. The spring teeth extend forwardly of the normal rigid teeth of the rake, and the distance between the rigid and spring teeth is not sufficient to permit a substantial pile of material to accumulate between the two sets of teeth. Instead, both sets of teeth engage a surface to be raked to provide an enhanced raking action, and the force developed from both sets of teeth is applied to the bar-like rake head. While this rake and attachment may easily gather a layer of leaves from the ground, it is incapable of containing and moving a pile of leaves during a raking operation, as the leaves would pour over the upper surface of the rake head, the bar and the spring teeth.

U.S. Pat. Nos. 3,332,223 and 4,351,145 disclose tined rakes which have multiple sets or double rows of tines to increase the material gathering efficiency of the rakes. However, the prior art rakes fail to incorporate any structure for efficiently handling piles of accumulated material without unduly stressing the tines or the areas of the rake head where the tines are attached.

Clearly, despite a long history of rake development, the problem of providing a rake which enables the containment and moving of accumulated material efficiently, without interrupting the raking operation and without damaging or weakening the tines and rake head, has never been addressed.

DISCLOSURE OF THE INVENTION

Therefore, it is a general object of the present invention to provide a rake for raking leaves and similar material which is designed to move accumulated material without cessation of the raking operation and to increase the overall efficiency of raking operations.

It is a specific object of the present invention to provide an improved rake for the raking of leaves and like material which has a plurality of flexible, resilient tines with leaf-engaging tine ends for the accumulation of material and, substantially spaced from the tines, much less flexible pile-handling bars which engage the upper regions of an accumulated pile of material during the normal raking operation.

Another object of the present invention is to provide an improved rake head for a rake which enables the user to use the rake to move a pile of accumulated material efficiently without changing the normal raking motion, such rake head having at least one row of pile-handling bars which are more rigid, much stronger, and at least twice as long as the leaf-engaging tine ends of the rake head.

A further object of the present invention is to provide an improved rake of the type having a handle attached to a rake head which has a flexible tine area at an end opposite to the handle. The rake head is formed with a less flexible, unitary body portion extending between the tines and the handle bar supporting pile-handling bars.

It is an additional object of the present invention to provide a rake head having a plurality of flexible, spaced tines extending from one end thereof, the tines joining the rake head at root ends of the tines. The rake head has pile-handling bars attached to it at a substantial distance from the root ends of the tines, such distance being sufficient for a substantial pile of material to accumulate between the tines and the pile-handling bars. The distance between the tines and the pile-handling bars is usually at least one third the length of the rake head.

Yet another object of the present invention is to provide pile-handling units in combination with a rake head wherein the rake head will contain a pile of material accumulated by raking tines extending from one end thereof and the pile-handling units will move portions of the pile during a raking operation.

These and other objects are accomplished in accordance with a preferred embodiment of the present invention by providing an improved tined rake of the type used to accumulate leaves and the like which has a handle and an attached rake head. The rake head includes a unitary body portion and a tine area with a plurality of spaced, flexible tines, each having a root end attached to the solid body portion. The tines each terminate at a laterally extending leaf-engaging tine end, and the rake head further includes a plurality of pile-handling bars attached to the unitary body portion at a distance from the root ends of the tines. This distance is at least one third the distance from the tine ends to the handle end of rake head, but the pile handling bars must also be spaced a substantial distance from the root ends of the tines. These pile-handling bars are less flexible, stronger and at least twice as long as the leaf-engaging tine ends, so that, without damaging the rake and without halting or changing a normal raking motion, a user of the improved rake of the present invention may efficiently and easily handle a pile of accumulated material.

DESCRIPTION OF THE FIGURES

FIG. 1 is a perspective view of a portion of the improved rake of the present invention;

FIG. 2 is a plan view of the underside of the rake of the present invention;

FIG. 3 is a perspective of an embodiment of the pile-handling bars formed on the rake of the present invention; and FIG. 4 is an exploded view of one of the pile-handling bars and means for attaching a pile-handling bar to a rake head in accordance with the present invention.

BEST MODE FOR CARRYNG OUT THE INVENTION

With reference to FIGS. 1 and 2, it will be noted that a rake formed in accordance with the present invention and designated generally at 2, includes a conventional elongated handle 4, having one end 6 attached to a generally triangular rake head 8. The rake head 8 may be molded of a suitable plastic material, and, for purposes of illustration is formed in the conventional fan-shaped configuration. It will be understood that the rake head may be formed in other known conventional shapes, for example, a generally rectangular shape.

In accordance with the present invention, the rake head 8 includes a body which has two general areas: the first being a unitary or solid body portion 10, including handle-engaging end 12, and the second being a tine area 14. The unitary body portion area 10 need not be absolutely solid, but can be slotted or apertured, so long as it provides a unitary structure to support the tine area 14. This body portion is adapted to provide a rigid, yet slightly resilient connection between the handle 4 and the tine area 14 and acts to relay user-exerted pressure from the handle to the tine area.

For material accumulation, the tine area 14 is divided into a plurality of individual, flexible tines 16, each including a root end 18 which joins the tine to solid body portion 10. The tines each extend in spaced, generally parallel relationship with adjacent individual tines, and terminate at an outermost end in a leaf-engaging tine end 20. The lead-engaging tine ends extend in a generally lateral direction from the longitudinal axis of each individual tine. The rake head exhibits increasing flexibility from handle-engaging end 12 of the solid body portion 10 to the leaf-engaging tine ends 20.

During a raking operation, the rake 2, as thus far described, communicates user-exerted pressure from the handle to the tine ends so that a layer of leaves or the like may be gathered from a surface into a pile. As the pile of accumulated material grows, the user must exert more and more pressure to move it, and when a very large mass of accumulated material is contacted, the flexible tines simply bend or, in many instances, completely break off. Normally, this breakage of the rake head occurs in the area of greatest stress 21 which is adjacent the root ends 18 of the tines. Consequently, the user often is forced to cease normal raking operations to remove the pile of accumulated material by another means or to use the rake to handle or move repetitively only an upper region or small part of the pile until the surface being raked is once again reached.

To constantly move a pile of accumulated material, without interrupting a raking operation or the normal raking motion, the rake head 8 of the present invention includes at least a single group or row 22 of spaced pile-handling bars 24. This row of bars is located on the rake head solid body portion 10 between the tine ends 20 and the handle-engaging end 12 and is substantially spaced from the tine ends 20 for at least one third the distance from the tine ends to the handle-engaging end 12.

In one embodiment, as shown in FIG. 1, the pile-handling bars 24 may be arranged in a single arcuate row, or alternatively, the pile-handling bars may be arranged in other configurations across the body portion 10. Also, as shown in FIG. 2, there may be a plurality of rows 22 and 23 of pile-handling bars, as long as the row 24 of the bars closest to the leaf-engaging tine ends 20 is spaced from the tine root end 10.

Each individual pile-handling bar 24 extends from the same side of the rake head 8 as the leaf-engaging tine ends 20, and each such pile-handling bar is longer than the leaf-engaging tine ends, and generally more rigid, and stronger than the individual tines 16. The pile-handling bars are preferably at least twice the length of the leaf-engaging tine ends, and may be molded integrally with the rake head or incorporated into the manufacturing of a bamboo or steel rake.

FIG. 3 shows a pile-handling bar 24 having an "I-beam" configuration which is molded integrally with the rake head. The bar 22 is molded to have two parallel, spaced flanges 26 and 28 connected by a central web 30 which extends perpendicularly to the flanges. This "I-beam" configuration provides the pile-handling bars with great rigidity and strength.

The rake head 8 of the present invention may be further strengthened by providing at least one molded reinforcing cross member 32 integral with the solid body portion 10. This reinforcing portion may traverse the rake head at approximately midway the distance from the handle attachment end 12 to the tine ends 20 and may be straight or arcuate. The reinforcing portion 32 increases the cross-sectional thickness of the solid body portion 10 and provides a strong, rigid surface for supporting the pile-handling bars as well as enhancing the pile-handling capability, strength and durability of the rake head 8.

In the embodiment of the rake head 8 shown in FIG. 4, the pile-handling bars 24 may be attached after the formation of a rake head, in which case they may be formed of any suitable material, for example, metal. To facilitate attachment, each pile-handling bar is provided with a threaded shank 36 which fits into an opening 38 extending through the reinforcing cross member 32 and the rake head 8. The shank 34 then receives a nut 40 to secure the pile-handling bar to the rake head.

The pile-handling bars may be cylindrical, semi-cylindrical, or of other similar configuration, and either molded or attached to the rake head. These bats extend laterally from the same side of the rake head as leaf-engaging tine ends and are at least twice the length of said leaf-engaging tine ends. Also, it might well be that the pile-handling bars may be molded to or attached to a straight or arcuate reinforcing cross member for subsequent attachment to a rake head by suitable mounting means after formation of said rake head, thereby providing a conventional rake head with pile-handling capability as well as imparting greater strength and rigidity to the rake head.

INDUSTRIAL APPLICABILITY

The rake 2 of the present invention incorporates a novel rake head 8 which operates to effectively permit a pile of material to develop and be contained behind the tine ends of the rake and to be progressively moved rearwardly during a normal raking operation. The pile is moved by pile-handling bars which project from the rake head a substantial distance behind the tine ends of the rake head, and the pile-handling bars 24 define a chamber in which a pile may accumulate as raking progresses. The unitary portion 10 contains the pile and prevents it from falling forward over the tines, and once the pile grows to a height sufficient to permit engagement with the pile-handling bars, these bars will engage the top section of the pile and move it rearwardly on every raking stroke. This leaves a significantly reduced pile of material behind the raking tine ends 20 which can be effectively handled by the rake without risking damage to the tines or the rake head.

I claim:

1. A rake head comprising:
   a head body having a first end and a second end spaced from said first end,
   a plurality of spaced, flexible tines extending from said second end of head body, said head body being of substantially greater rigidity than said tines, said tines each having an elongate tine body member extending outwardly from ssaid head body, the tine body member having a root end attached to said second end of said head body and a leaf engaging tine end opposite said root end which extends laterally from said tine body in a first direction, and
   pile handling means for engaging the upper regions of a pile of material accumulated behind said leaf engaging tine ends during raking operations, said pile handling means including a plurality of spaced, rigid, elongate pile handling bars immovably mounted upon said head body and spaced from the second end thereof for a distance equal to at least one third the distance between the first and second ends of said head body, said pile handling bars being of a length which is greater than the length of said leaf-engaging tine ends and extending in said first direction substantially parallel to said tine ends.

2. The rake head of claim 1, wherein said pile handling bars are at least twice as long as the length of said leaf-engaging tine ends.

3. The rake head of claim 2, wherein said rake head is molded of a plastic material.

4. The rake head of claim 3, wherein said rake head includes said pile handling means molded integrally therewith.

5. The rake head of claim 4, wherein said pile handling bars are molded to have an "I-beam" configuration.

6. The rake head of claim 4, wherein said pile handling bars are molded to have a cylindrical configuration.

7. A rake head comprising:
   a head body having a first end with a handle connection means formed therein and a second end spaced from said first end, said head body extending outwardly from said first end to said second end whereby said second end has a transverse width which is greater than that of said first end;
   a plurality of spaced, flexible tines extending from said second end of said head body, said head body being of substantially greater rigidity than said tines, said tines each having an elongate tine body member extending outwardly from said head body in substantially the same plane therewith, the tine body member having a root end attached to said second end of said head body and a leaf-engaging tine end opposite said root end which extends laterally from said tine body in a first direction, the distance between said first and second ends of said head body being at least equal to the length of said tine body members between the root end and leaf engaging tine end thereof; and
   pile handling means for engaging the upper regions of a pile of material accumulated behind said leaf engaging tine ends during raking operations, said pile handling means including a plurality of spaced, rigid, elongate pile handling bars immovably mounted upon said head body and spaced from the second end thereof for a distance equal to at least one third the distance between the first and second ends of said head body, said pile handling bars being of a length which is at least twice the length of said leaf-engaging tine ends and extending in said first direction substantially perpendicular to said head body.

8. The rake head of claim 7 wherein said elongate pile handling bars are arranged transversely of said head body.

9. The rake head of claim 8 wherein said elongate pile handling bars are arranged in a plurality of spaced, substantially parallel rows which extend transversely across said head body.

10. The rake head of claim 7 wherein said elongate tine body members extend outwardly at an angle from the second end of said body member to form a rake head having the widest transverse dimension at said leaf engaging tine ends of said tines.

11. The rake head of claim 7 wherein said head body is formed with at least one reinforcing member extending transversely across said head body between the first and second ends thereof, said elongate pile handling bars being mounted upon said reinforcing member.

12. The rake head of claim 11 wherein said head body, flexible tines, reinforcing member and pile handling means comprise a unitary integrally molded configuration formed of plastic material.

13. The rake head of claim 12 wherein said elongate tine body members extend outwardly at an angle from the second end of said body member to form a rake head having the widest transverse dimension at said leaf engaging tine ends of said tines.

14. The rake head of claim 13 wherein said pile handling bars are arranged in at least one row extending transversely of said head body, said row of pile handling bars extending substantially parallel to said leaf-engaging tine ends.

15. The rake head of claim 7 wherein said elongate, pile handling bars are removably mounted upon said head body.

* * * * *